United States Patent [19]

Ito

[11] 4,417,213
[45] Nov. 22, 1983

[54] DATA REGENERATIVE SYSTEM FOR NRZ MODE SIGNALS

[75] Inventor: Yasuo Ito, Yokohama, Japan

[73] Assignee: Victor Company of Japan, Limited, Yokohama, Japan

[21] Appl. No.: 247,184

[22] Filed: Mar. 24, 1981

[30] Foreign Application Priority Data

Mar. 27, 1980 [JP] Japan .................................. 55-39213

[51] Int. Cl.³ .......................... H03K 5/01; H03K 5/08
[52] U.S. Cl. .................................... 328/164; 307/268; 307/269; 328/63; 328/74
[58] Field of Search ................ 307/268, 269, 354, 358, 307/359; 328/63, 72, 74, 164

[56] References Cited

U.S. PATENT DOCUMENTS

| 3,757,051 | 9/1973 | Girard et al. ........................ 328/164 |
| 3,986,053 | 10/1976 | Döemer .............................. 328/164 |
| 4,051,473 | 9/1977 | Hooker, Jr. ......................... 307/359 |

*Primary Examiner*—John Zazworsky
*Attorney, Agent, or Firm*—Pollock, Vande Sande & Priddy

[57] ABSTRACT

A data regenerative system adapted to receive data signals transmitted with the Non-Return-to-Zero mode comprises a comparator for comparing the voltage level of the received data with a variable threshold to generate a digital comparator output. D-type flip-flops are arranged to receive the comparator output to generate first and second pulses respectively in response to a data strobe clock pulse. The time difference between the first and second pulses is detected to generate an error voltage which is applied to the comparator as the variable threshold to keep the crossing points of the eye pattern of the received signal constantly aligned on the threshold level. A variable width monostable multivibrator is responsive to synchronization pulses to generate the data strobe clock pulses with a duration that is a function of the difference between each period of the first and second pulses and one-half period of a third pulse generated by a D-type flip-flop in response to the leading edge transition of the output of the monostable multivibrator in the presence of the first and second pulses. Output pulses are regenerated in response to the output of the monostable multivibrator in the presence of the comparator output.

10 Claims, 7 Drawing Figures

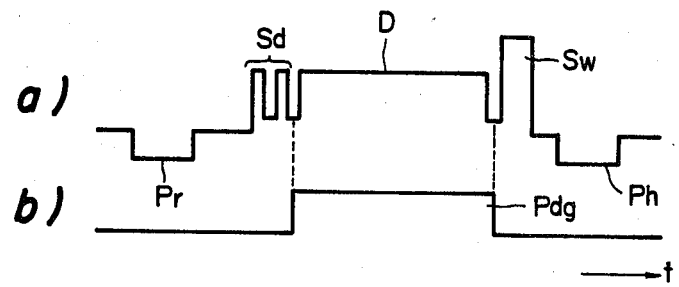
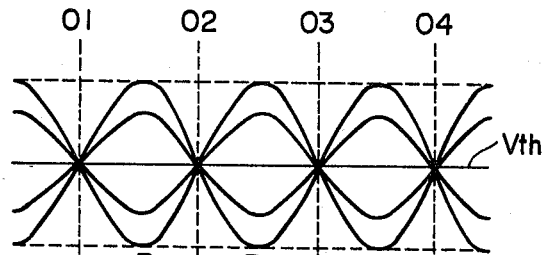
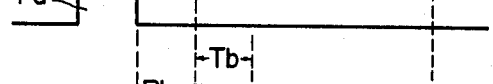

DATA REGENERATIVE SYSTEM FOR NRZ MODE SIGNALS

BACKGROUND OF THE INVENTION

The present invention relates to a system for regenerating data from Non-Return-to-Zero mode data received via a transmission or recording medium to recover the original diata waveform.

Non-Return-to-Zero coding is a mode of transmission or recording-and-readout in which it is not necessary for the signal to return to zero after each item of transmitted or recorded data. One pulse amplitude level represents digital 1 and another pulse level, which may or may not be of opposite polarity, represents 0. This mode of transmission or recording is advantageous in that it permits storing about twice as much data as can be recorded with the return-to-zero mode. However, the signal transmitted with the Non-Return-to-Zero mode tends to distort in pulse waveform during transmission or recording-readout process so that the received waveform is remarkably different from the original one if the intermediary system has unfavorable transmission or recording-reproducing characteristics.

The received signal is usually applied to an input of a comparator for making a comparison with a predetermined threshold level in response to a timing pulse known as data strobe clock pulse to permit discrimination of the signal between digital 1 or 0. If the setting point of the threshold level should deviate from the correct value, however, the system will erroneously discriminate the digital values. Furthermore, if the data strobe clock pulse is out of phase with correct timing and if the signal is obscured by noise in the system, a similar situation is likely to occur.

One approach to this problem would be to adjust the setting of the comparator threshold at a point intermediate between the maximum and minimum peaks of the transmitted signal. However, a satisfactory result is difficult to obtain if the transmitted waveform is distorted by noise to such an extent that the peak amplitude levels of opposite polarities are not symmetrical with respect to each other. Another approach would be to utilize the peak level of a synchronization pulse or the pedestal of a digital video or audio signal as a reference. However, the circuits available for clamping such voltage levels are far from the ideal for this purpose. Even if an ideal clamping circuit should become available, the threshold level would deviate from the correct setting if the received data contains a series of digital 1's or a series of 0's, or if the signal is reproduced from video tape recorders having different wave response characteristics due to their particular operating performance and particular types of recording medium.

SUMMARY OF THE INVENTION

The present invention is based on the recognition of the fact that the NRZ-mode data is transmitted at a known transmission rate and that the crossing point of the eye pattern of the received data is not susceptible to variation under varying characteristics of the wave response of the transmission or recording system and under varying degrees of contaminating noise.

The data regenerative system, according to one aspect of the invention, includes a comparator for detecting the phase inversion point of the received data and a detector for detecting the time of occurrence of data strobe clock pulses for the purpose of correcting the threshold of the comparator so that the crossing points of the eye pattern are aligned on the threshold level. Preferably, the system comprises a pair of first and second bistable circuits which are arranged to alternately respond to the output of the comparator to generate successive first and second pulses which are respectively terminated in response to the leading edge of a data strobe clock pulse. The difference in duration between the first and second pulses is detected to generate an error voltage which is applied to the comparator as its threshold level. A third bistable device responds to the leading edge transition of a data strobe clock by generating a pulse in the presence of a digital 1 output from the comparator to reconstruct the original pulse.

In accordance with a second aspect of the invention, a phase error signal is derived from the phase inversion of the received data and from the detected time of occurrence of data strobe clock pulses to maintain the latter in a correct phase relationship with the received data. Preferably, the system includes a variable width monostable multivibrator which receives data strobe clock pulses from a pulse generator synchronized with the received data. The first and second pulses generated by the bistable devices are supplied to the data input of a D-type flip-flop which is clocked in response to the leading edge transition of the output of the monostable multivibrator to generate a third pulse whose duration is twice the duration of each of the first and second pulses. The phase error signal is derived from a detector which senses the difference in duration between each period of the first and second pulses and one-half period of the third pulse. The phase error signal is applied to the monostable multivibrator to control the pulse duration of its output pulse. The output of the monostable multivibrator is used to clock the third bistable device at correct timing.

BRIEF DESCRIPTION OF THE DRAWINGS

The invention will be further described by way of example with reference to the accompanying drawings, in which:

FIG. 1 is a schematic illustration of a typical waveform of a signal transmitted with the Non-Return-to-Zero mode;

FIGS. 2a to 2e are illustrations of waveforms useful for understanding the principle of the invention.

GENERAL DESCRIPTION OF THE REGENERATIVE SYSTEM

Figure 3:
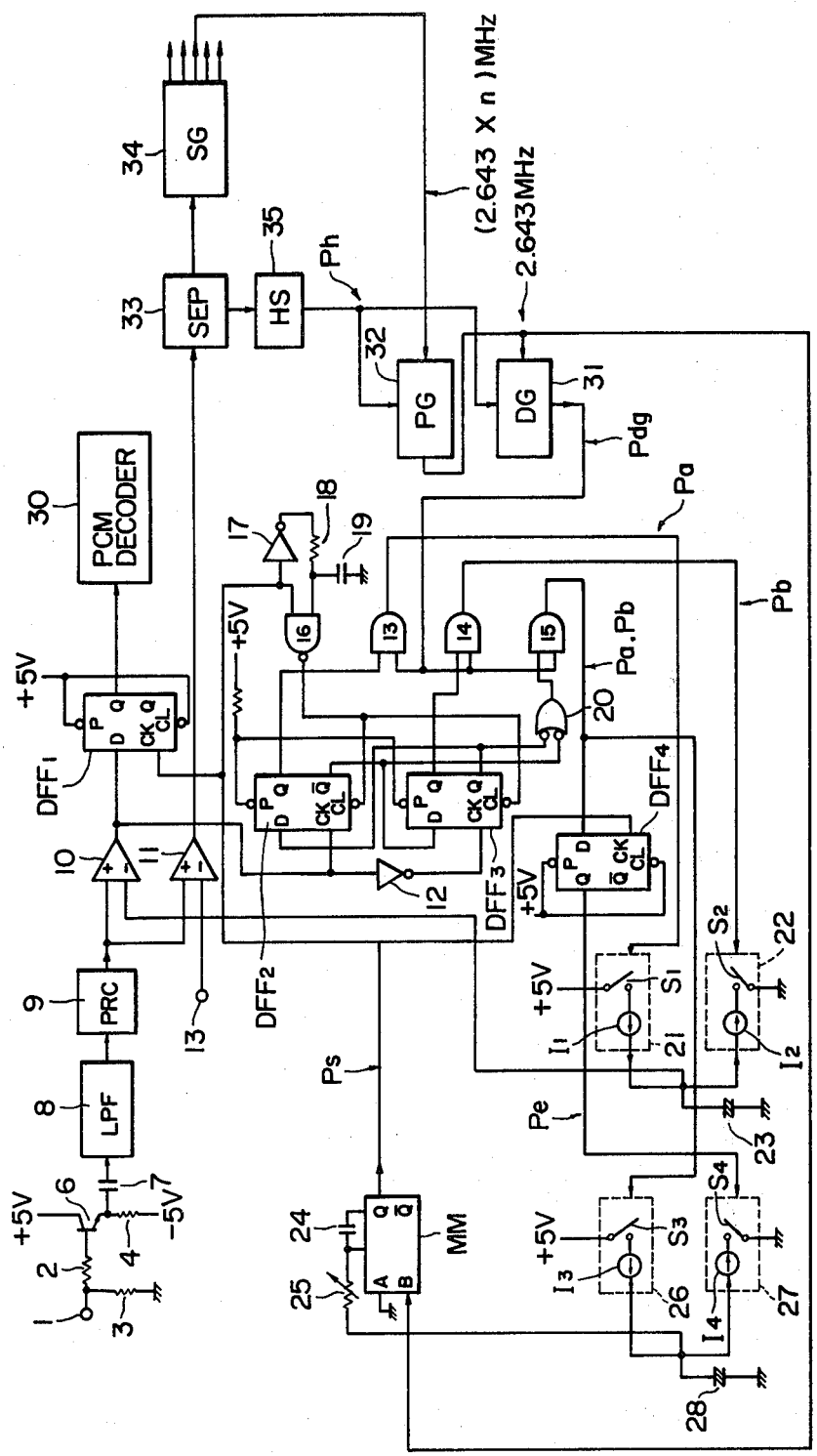
FIG. 3 is an illustration of a practical embodiment of the data regenerative system of the present invention.

Before going into the detail of the present invention the principle of the invention will be first described with reference to FIGS. 1, 2a to 2e. The present invention is based on the fact that the eye pattern of transmitted NRZ-code data signal has a tendency to remain unaffected under differing response characteristics of the transmission or recording medium and in the presence of noise in such medium. In FIG. 1a, a PCM signal in the format of Non-Return-to-Zero coding is partially illustrated as comprising a horizontal sync pulse Ph, a white reference signal Sw, a data synchronization signal Sd and information data D which contains 128 bits of information. The information data D is separated from other signals by a data gate pulse Pdg illustrated in FIG. 1b. The eye pattern of the waveform of the transmitted data is illustrated in FIG. 2a in a simplified form for clarity in which the waveform is shown to have crossing points at 01, 02, 03 and 04 on a threshold level Vth. FIG. 2b shows a train of data strobe pulses Ps which occurs at a repetition rate corresponding to the rate at which the data is transmitted.

For purposes of convenience it is assumed that the threshold level Vth lies at a level corresponding to the crossing points of the eye pattern as illustrated in FIG. 2a and that the leading edge transition of the data strobe pulses Ps occurs at the midpoint between successive crossing points as illustrated in FIG. 2b. If the successively arriving data pulses are assumed to change alternately between 0 and 1 in repetition, the time period Ta between the crossing point where the data changes from 0 to 1 and the leading edge transition of a subsequent data strobe pulse Ps equals the time period Tb between the crossing point where the data changes from 1 to 0 and the leading edge transition of a subsequent data strobe pulse.

Considering now that the threshold level Vth has increased to a level higher than is illustrated in FIG. 2a on the assumption that the time of occurrence of the leading edge transition of the date strobe pulses remains unchanged. Then, the period Ta will become smaller than is illustrated in FIG. 2c, while the period Tb will become greater than is illustrated in FIG. 2d. Since the sum of periods Ta and Tb remains substantially unchanged even though the threshold level Vth should vary over period of time within a range between the maximum and minimum peaks of the data shown in broken lines in FIG. 2a, the difference between periods Ta and Tb represents the deviation of the threshold level Vth from the level on which zero crossing points should be aligned. It is therefore possible to keep the crossing points of the eye pattern aligned on the threshold level Vth by correcting the latter in response to the difference between Ta and Tb, so that the received data can be clearly discriminated between 0 and 1 levels.

In a practical embodiment of the invention, it is desirable that the data strobe clock pulse maintains its midpoint phase relationship with the information data. This is accomplished by generating pulses Pa and Pb (FIGS. 2c and 2d) with durations of Ta and Tb, respectively, in response to the trailing edge transition of alternately occurring data strobe clock pulses Ps and by generating a pulse Pe (FIG. 2e) of a duration Tr which is twice the pulse duration Ta or Tb and prevails during the interval between successive leading edge transistions of the strobe clock pulse Ps. The difference between Tr/2 and Ta (or Tb) represents the phase deviation of the strobe pulse from the received information data. By controlling the phase of the data srobe pulse Ps in accordance with the detected phase deviation, it is possible to maintain the leading edge transition of the data strobe pulse in phase with the midpoint of the interval between successive crossing points in the eye pattern.

STRUCTURE OF THE REGENERATIVE SYSTEM

The data regenerative system according to the invention comprises generally a low-pass filter 8 which receives a NRZ-coded PCM composite television signal from input terminal 1 via a preamplifier formed by resistors 2, 3, 4, a transistor 6 and a coupling capacitor 7 to eliminate high frequency quantum noise. A processing circuit 9, including an automatic gain-controlled amplifier and a clamping circuit, is connected to the output of the low-pass filter 8 and delivers its output to the noninverting input of a comparator 10 for making a comparison with a variable reference voltage developed across a storage capacitor 23. The variable reference voltage is controlled by a current supply circuit 21 and a current drain circuit 22 which respectively include switches S1 and S2 which are in turn respectively controlled by output signals from AND gates 13 and 14. The output of the comparator 10 is connected on the one hand to the data input terminal of a first D-type flip-flop DFF1 and on the other hand to the clock input terminal of a second data flip-flop DFF2, and further via an inverter 12 to the clock input of a third data flip-flop DFF3. The Q output of the first D-type flip-flop DFF1 is connected to a PCM decoder 30. The second and third D-type flip-flops DFF2 and DFF3 are cross-coupled so that the complementary output $\overline{Q}$ of each flip-flop is connected to the data input of the other flip-flop. This cross-coupled arrangement serves to ensure against noise which would otherwise cause them to operate erroneously. The outputs of the second and third flip-flops DFF2 and DFF3 are respectively connected to the AND gates 13 and 14 which are enabled in response to an output signal from a data gate pulse generator 31 to pass the outputs of the associated D-type flip-flops to the circuits 21 and 22. The complementary outputs of the second and third D-type flip-flops are further connected to inverted inputs of an OR gate 20 and thence to an input of an AND gate 15 the other input of which is connected to the output of the data gate pulse generator 31. The output of the AND gate 15 is connected on the one hand to the data input of a fourth D-type flip-fop DFF4 and on the other hand to a current supply circuit 26 including a switch S3 and a constant current source I3. The fourth D-type flip-flop DFF4 receives its clock signal from the output of a variable pulse width type monostable multivibrator MM, the Q output of the flip-flop DFF4 being connected to a current drain circuit 27 including a switch S4 and a constant current source I4. The current supply circuit 26 and current drain circuit 27 are connected to a storage capacitor 28 to develop a control voltage for application to the time constant circuit, formed by a variable resistor 25 and a capacitor 24, of the monostable multivibrator MM.

The output of the processing circuit 9 is further connected to the noninverting input of a second comparator 11 for comparison with a reference signal supplied to an input terminal 13 and generates a composite synchronization signal for application to a sync separator 33 which separates the input synchronization signals into vertical and horizontal sync signals. The vertical sync signal is applied to a signal generator 34, which includes by a phase-locked loop and a frequency multiplier to multiply the vertical frequency by an integral multiple "n" and generates output pulses at a frequency of (2.643×n) MHz and other signals needed for other circuits of the system. The frequency-multiplied vertical sync signal is fed to an input of a data strobe clock pulse generator 32 which also receives horizontal sync pulses from the separator 33 via a horizontal frequency stabilizer 35, which also supplies its frequency stabilzed horizontal sync pulses to the input of the data gate pulse generator 31. The data strobe clock pulse generator 32 divides the frequency of the signal supplied from the signal generator 34 by the integral multiple "n" and generates a signal at a frequency 2.643 MHz which is synchronized with the signal supplied from the frequency stabilizer 35. The 2.643 MHz strobe clock pulse is supplied on the one hand to the data gate pulse generator 31 and on the other hand to the monostable multivibrator MM. The output from the data gate pulse generator is the gate pulse Pdg illustrated in FIG. 1 for gating the data contained in the PCM encoded pulse stream.

The output signal from the monostable multivibrator MM is supplied on the one hand to the clock input of the fourth D-type flip-flop DFF4, as described above, and on the other hand to the clock input of the first D-type flip-flop DFF1, and further to an input of a NAND gate 16. The NAND gate 16 receives another signal from a spike generator formed by an inverter 17, resistor 18 and capacitor 19 to generate a clear pulse to the clear inputs of the second and third D-type flip-flops DFF2 and DFF3.

OPERATION OF THE REGENERATIVE SYSTEM

The PCM signal including information data and synchronization data is compared with the reference voltage developed in the capacitor 23 in the comparator 10. This reference voltage represents the threshold voltage Vth of the comparator 10 so that its output switches to a binary "1" or "0" in response to the input from the processor circuit 9 being higher or lower than the threshold level, respectively. The second D-type flip-flop DFF2 is clocked in response to a 0-to-1 transition of the output of the comparator 10 to cause its Q output to switch to a logical 1 state, while the third D-type flip-flop DFF3 is clocked through inverter 12 in response to a 1-to-0 transition of the output of the comparator 10.

The monostable multivibrator MM generates data strobe clock pulses Ps (FIG. 2b) with a duration determined by the voltage supplied from the storage capacitor 28 to provide phase control action on the pulse supplied from the data strobe clock pulse generator 32. In response to the leading edge transition of the output of the monostable multivibrator MM a clearing pulse is generated at the output of the NAND gate 16 to clear the second and third D-type flip-flops DFF2 and DFF3. Therefore, a pulse Pa of a duration Ta appears at the Q output of the second D-type flip-flop DFF2 in response to the zero crossing point at time 01 (FIG. 2a), and a pulse Pb of a duration Tb appears at the Q output of the third D-type flip-flop DFF3 in response to the zero crossing point at time 02.

In the presence of a data gate pulse from the gate pulse generator 31, the pulses Pa and Pb are passed through the AND gates 13 and 14 respectively to the current supply circuit 21 and to the current drain circuit 22. In response to the application of the pulse Pa, the switch S1 of the circuit 21 is closed to connect +5 volt DC voltage to a constant current source I1 which in turn supplies a constant current to the storage capacitor 23 so that the voltage thereacross increases as a function of pulse duration Ta. In response to the subsequent pulse Pb, the switch S2 of the current drain circuit 22 is closed to complete a circuit for a constant current source I2 to drain a constant current from the capacitor 23 so that the voltage thereacross decreases as a function of the pulse duration Tb. It can be seen therefore that the net voltage developed in capacitor 23 represents the difference between the pulse durations Ta and Tb and the threshold level of the comparator 10 is varied as a function of the difference between Ta and Tb.

On the other hand, the AND gate 15, which is receptive of the complementary outputs of the second and third D-type flip-flops DFF2 and DFF3, generates pulses Pa and Pb in succession in the presence of each data gate pulse from the circuit 31.

In response to each of the pulses Pa and Pb, the switch S3 of the current supply circuit 26 is closed to connect a +5 volt supply to the storage capacitor 28 through constant current source I3 to increase the voltage in capacitor 28 as a function of the pulse duration Ta and Tb. The fourth D-type flip-flop DFF4, which is receptive of pulses Pa and Pb in succession, is clocked in response to the leading edge transition of a first strobe clock pulse $Ps_1$ from the monostable multivibrator MM to generate an output pulse $Pe_1$ in the presence of the pulse Pa. If digital 1 and 0 (or 0 and 1) occur in succession, a pulse $Pe_2$ will occur in succession to pulse $Pe_1$ in response to the leading edge of a second strobe clock pulse $Ps_2$ in the presence of pulse Pb and the pulse $Pe_2$ is terminated in response to the leading edge transition of the third strobe clock pulse $Ps_3$ in the absence of the pulses Pa and Pb. The output pulse from the fourth D-type flip-flop DFF4 causes the switch S4 of the current drain circuit 27 to complete a current drain circuit through constant current source I4 for the storage capacitor 28 so that the voltage thereacross decreases as a function of the duration Tr.

The constant current source I4 of the current drain circuit 27 is designed so that the current drained from the capacitor 28 to ground is one-half the amount of the current supplied to it from the constant current souce I3 of the current supply circuit 26, whereby the voltage developed in the capacitor 28 by the current drain circuit 27 is representative of one-half of the pulse duration Tr. Therefore, the net voltage developed in the capacitor 28 represents the difference between pulse duration Ta (or Tb) and Tr/2. Since the period of the monostable multivibrator MM is determined by the voltage supplied from the capacitor 28, the leading edge of the data strobe clock pulse is advanced by an amount that is a function of the difference Ta-Tr/2 (or Tb-Tr/2). Therefore, the data strobe clock pulse is feedback controlled so that its leading edge conforms to the midpoint of successive crosspoints of the eye pattern.

Depending on the waveform of transmitted signals, it is desirable that the leading edge of the data strobe clock pulse correspond to a point which may deviate from the midpoint of the successive crosspoints. In this instance the amount of current drained by the circuit 27 is varied in relation to the current supplied by the circuit 26 from the ½ value by an amount corresponding to the deviation from the midpoint.

What is claimed is:

1. A system for regenerating data from received Non-Return-to-Zero mode data, comprising:
    a comparator having a first input receptive of said NRZ mode data and a second input receptive of a variable threshold voltage for comparison with the voltage of said NRZ mode data for generating a first or a second comparator output having first and second discrete values respectively depending on the relative value of the voltage applied to the first input to the voltage applied to the second input;
    first means for generating data strobe clock pulses at a rate in conformance with the rate at which said NRZ mode data is received;

second means for generating an error signal in accordance with the difference between the time of occurrence of each of said first and second comparator outputs and the time of occurrence of said data strobe clock pulse, said error signal being applied to the second input of said comparator as said variable threshold voltage; and third means for generating an output pulse of the system initiating in response to the leading edge transition of said data strobe clock pulse in the presence of said first comparator output and terminating in response to the leading edge transition of said data strobe clock pulse in the presence of said second comparator output.

2. A system as claimed in claim 1, wherein said second means comprises:

means for generating a first-period pulse initiating in response to the leading edge transition of each of said comparator outputs and terminating in response to the leading edge transition of said data strobe clock pulse and a second-period pulse initiating in response to the trailing edge transition of said comparator output and terminating in response to the leading edge transition of said data strobe clock pulse; and means for generating a voltage as a function of the difference between the periods of said first- and second-period pulses for application to said second input of said comparator as said variable threshold voltage.

3. A system as claimed in claim 2, wherein said first means comprises:

means for generating a third-period pulse initiating in response to the leading edge transition of an input pulse applied thereto in the presence of said first- or second-period pulse and terminating in response to the leading edge transition of said input pulse in the absence of said first- or second-period pulse; and means for generating a fourth-period pulse in synchronism with said received NRZ data, said fourth-period pulse having a duration which is a function of the difference between each period of said first- and second-period pulses and one-half of the period of said third-period pulse, said fourth-period pulse being said data strobe clock pulse and applied to said third-period pulse generating means as said input pulse.

4. A system as claimed in claim 2, wherein said voltage generating means comprises:

a storage capacitor;

a current supplying means responsive to said first-period pulse for charging said storage capacitor; and a current draining means responsive to said second-period pulse for discharging said storage capacitor to develop therein said variable threshold voltage.

5. A system as claimed in claim 2 or 4, wherein said means for generating first- and second-period pulses comprises:

a first D-type flip-flop having a clock input connected to receive each of said comparator outputs, a clear input receptive of said data strobe clock pulse, and a true output for generating said first-period pulse; and a second D-type flip-flop having a clock input receptive of each of said comparator outputs via an inverter, a clear input receptive of said data strobe clock pulse, and a true output for generating thereat said second-period pulse, each of said first and second D-type flip-flops having a data input and a complementary output which is connected to the data input of the other flip-flop.

6. A system as claimed in claim 5, wherein said third means comprises a D-type flip-flop having a clock input receptive of said data strobe clock pulse and a data input receptive of each of said comparator outputs for generating said output pulse of said system at an output terminal thereof.

7. A system as claimed in claim 3, wherein said third-period pulse generating means comprises a D-type flip-flop having a clock input receptive of said data strobe clock pulse and a data input receptive of said first- and second-period pulses in succession for generating said third-period pulse at an output thereof, and wherein said fourth-period pulse generating means comprises:

a storage capacitor;

a current supplying means responsive to each of said first- and second-period pulses to charge said storage capacitor at a first constant rate;

a current draining means responsive to said third-period pulse to discharge said storage capacitor at a second constant rate which is one-half of said first constant rate; and a variable period monostable multivibrator responsive to a synchronization signal contained in said received NRZ data and responsive to the voltage developed in said storage capacitor for generating said fourth-period pulse with a duration which is a function of said voltage in said storage capacitor.

8. A system for regenerating data from received Non-Return-to-Zero mode data, comprising:

a comparator having a first input receptive of said NRZ mode data and a second input receptive of a threshold voltage for comparison with the voltage of said NRZ mode data at said first input to generate a first or a second comparator output having first and second discrete values respectively depending on the relative value of the voltage applied to the first input to the voltage applied to the second input;

first means for generating data strobe clock pulses;

second means for generating a phase error signal in accordance with the difference between the occurrence of each of said comparator outputs and the occurrence of said data strobe clock pulse and connected in a closed loop feedback circuit with said first means for controlling said first means to maintain said data strobe clock pulse in a predetermined phase relationship with the received NRZ data; and third means for generating an output pulse of said system initiating in response to the leading edge transition of said data strobe clock pulse in the presence of said first comparator output and terminating in response to the leading edge transition of said data strobe clock pulse in the presence of said second comparator output.

9. A system as claimed in claim 8, wherein said first means comprises for generating a variable width pulse in synchronism with said received NRZ data with a duration which is a function of an input voltage applied thereto, and wherein said second means comprises:

means for generating a first-period pulse initiating in response to the leading edge transition of each of said comparator outputs and terminating in response to the leading edge transition of said data strobe clock pulse and a second-period pulse initiating in response to the trailing edge transition of each of said comparator outputs and terminating in response to the leading edge transition of said data strobe clock pulse;

means for generating a third-period pulse initiating in response to the leading edge transition of said variable width pulse in the presence of said first- or second-period pulse and terminating in response to the leading edge transition of said variable width pulse in the absence of said first- or second-period pulse; and means for generating a voltage which is a function of the difference between each period of said first- and second-period pulses and one-half of the period of said third-period pulse for application to said variable width pulse generating means as said input voltage.

10. A system as claimed in claim 9, wherein said third-period pulse generating means comprises a D-type flip-flop having a clock input receptive of said data strobe clock pulse and a data input receptive of said first- and second-period pulses in succession for generating said third-period pulse at an output thereof, and wherein said voltage generating means comprises:

a storage capacitor connected to the input of said variable width pulse generating means;

a current sypplying means responsive to each of said first- and second-period pulses to charge said storage capacitor at a first rate; and a current draining means responsive to said third-period pulse to discharge said storage capacitor at a second rate which is one-half of said first rate.

* * * * *